United States Patent
Wang

(10) Patent No.: US 8,078,057 B2
(45) Date of Patent: Dec. 13, 2011

(54) CENTRALIZED CONGESTION AVOIDANCE IN A PASSIVE OPTICAL NETWORK

(75) Inventor: Allen Wang, Plano, TX (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 593 days.

(21) Appl. No.: 12/280,311

(22) PCT Filed: Sep. 28, 2006

(86) PCT No.: PCT/EP2006/066838
§ 371 (c)(1),
(2), (4) Date: Feb. 17, 2009

(87) PCT Pub. No.: WO2007/096006
PCT Pub. Date: Aug. 30, 2007

(65) Prior Publication Data
US 2009/0245784 A1    Oct. 1, 2009

Related U.S. Application Data

(60) Provisional application No. 60/775,081, filed on Feb. 21, 2006.

(51) Int. Cl.
*H04J 14/08* (2006.01)
*H04J 14/02* (2006.01)
(52) U.S. Cl. .......................................... 398/99; 398/89
(58) Field of Classification Search ............... 398/66–72, 398/88, 89
See application file for complete search history.

(56) References Cited

U.S. PATENT DOCUMENTS

| 2003/0145109 A1 | 7/2003 | Nakashima |
| 2004/0114576 A1 | 6/2004 | Itoh et al. |
| 2005/0249497 A1* | 11/2005 | Haran et al. .................... 398/58 |
| 2006/0159040 A1 | 7/2006 | Takemoto et al. |

FOREIGN PATENT DOCUMENTS

| EP | 0957654 A | 11/1999 |
| EP | 1091525 A2 | 4/2001 |
| JP | 2003152752 A | 5/2003 |
| JP | 2003218916 A | 7/2003 |
| WO | 2005027428 A1 | 3/2005 |

OTHER PUBLICATIONS

Floyd, S. et al., "Random Early Detection Gateways for Congestion Avoidance", IEEE/ACM Transactions on Networking, IEEE/ACM, New York, NY, US, vol. 1, No. 4, Aug. 1, 1993, pp. 397-413, XP000415363, ISSN: 1063-6692, p. 397, paragraph I-p. 400, paragraph IV.

* cited by examiner

*Primary Examiner* — Leslie Pascal
(74) *Attorney, Agent, or Firm* — Laurence A. Greenberg; Werner H. Stemer; Ralph E. Locher

(57) ABSTRACT

In one aspect, a method for congestion avoidance in a passive optical network having an optical line terminal communicatively connected to a plurality of optical network termination devices is provided. A dynamic bandwidth allocation information is periodically requested from the optical network termination device and the optical line terminator receives the response to the request. An adjusted bandwidth allocation for the optical network termination device is determined by the optical line terminator. The optical line terminator determines a packet-drop command to be taken at the optical network termination device. The adjusted bandwidth allocation and the packet-drop command are sent to the optical network termination device.

18 Claims, 5 Drawing Sheets

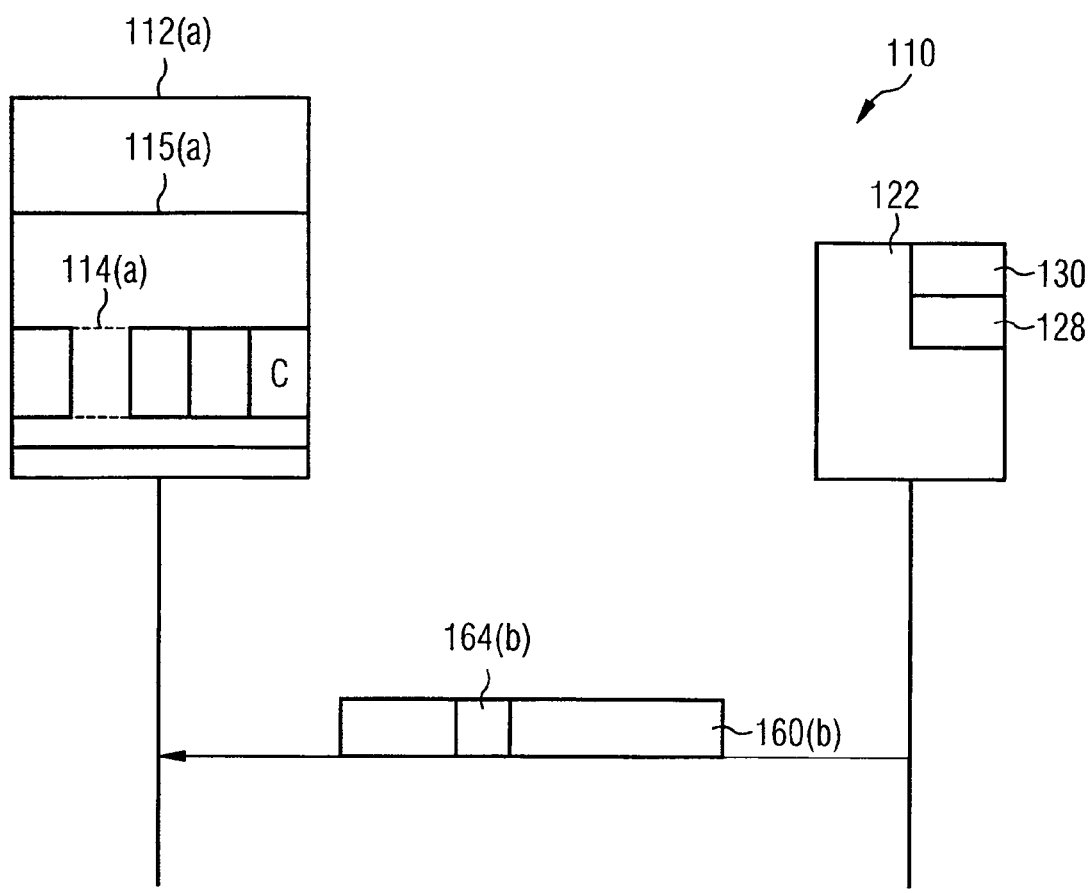

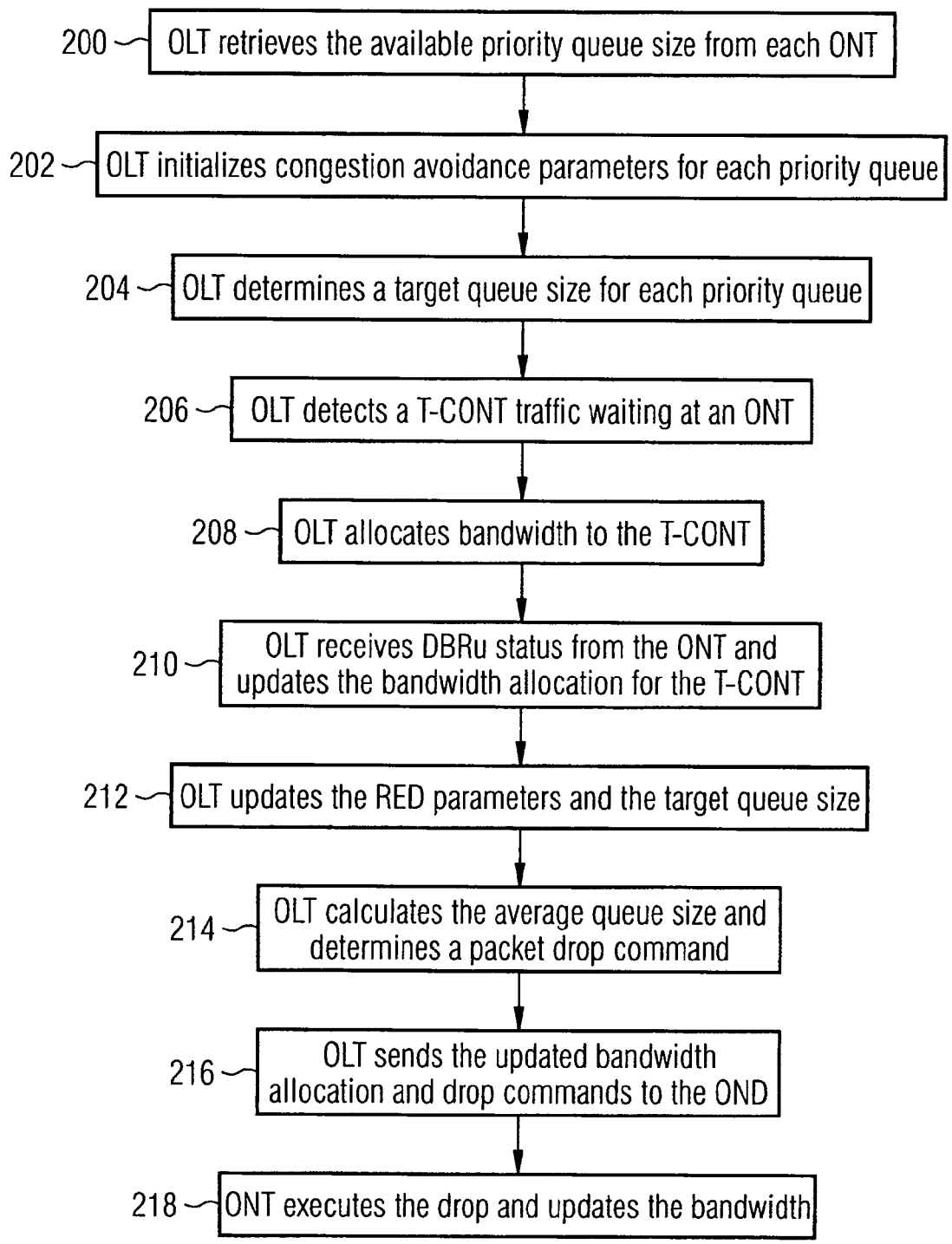

CENTRALIZED CONGESTION AVOIDANCE IN A PASSIVE OPTICAL NETWORK

CROSS-REFERENCE TO RELATED APPLICATIONS

The present application is a national stage application of PCT/EP2006/066838, filed Sep. 28, 2006, which claims the benefit of priority to the provisional patent application filed on Feb. 21, 2006, and assigned application No. 60/775,081.

TECHNICAL FIELD OF THE INVENTION

The present invention relates to congestion avoidance in a communication network and more particularly, to providing a centralized and dynamically-adjusting-congestion avoidance in a Passive Optical Network.

BACKGROUND OF THE INVENTION

Network congestion often occurs when there is an overcrowding of traffic in the network. The term "traffic" refers to a packet, a message, streams, or other suitable form(s) of data, voice or combinations thereof. Symptoms of network congestion can include, for example, network delay, degradation of quality of service (QOS), and an extreme underutilization of network capacity. For this reason, communications systems typically employ techniques to avoid network congestion when oversubscription is applied. The term "oversubscription" refers to when the total amount of bandwidth that is assigned to subscribers is more than actual capacity.

SUMMARY OF THE INVENTION

An aspect of the present invention involves a method for congestion avoidance in a passive optical network having an optical line terminator communicatively connected to a plurality of optical network termination devices. The method comprising periodically requesting a dynamic bandwidth allocation information from an optical network termination device by the optical line terminator, receiving the dynamic bandwidth allocation information having a queue fill level from the optical network termination device in response to the request, determining an adjusted bandwidth allocation for the optical network termination device by the optical line terminator, determining by the optical line terminator a packet-drop command to be taken at the optical network termination device, and sending to the optical network termination device the adjusted bandwidth allocation and the packet-drop command. Whereby dynamic congestion avoidance is provided centrally at the optical line terminator for the plurality of devices.

Another aspect of the present invention involves a method for congestion avoidance in an optical network termination device of a passive optical network. The method comprising sending upon request, a dynamic-bandwidth-allocation information to an optical line terminator, receiving an adjusted bandwidth allocation and a packet-drop command from the optical line terminator, and executing the packet-drop command. Whereby a dynamic-congestion avoidance is provided remotely for the optical line terminator.

Yet another aspect of the present invention involves an optical line terminator providing a dynamic congestion avoidance in a passive optical network. The optical line terminator comprising a communication connection to a plurality of optical network termination devices each having a priority queue, a plurality of network avoidance parameters, a dynamic bandwidth mechanism that allocates bandwidth for the optical network termination devices and that dynamically updates the network avoidance parameters, a feedback mechanism that analyzes upstream traffic from the optical network termination device and periodically provides information based on the analysis to the dynamic bandwidth mechanism to aid in the update of the parameters. Whereby a dynamic-congestion avoidance is provided centrally at the optical line terminator for the plurality of devices.

BRIEF DESCRIPTION OF THE DRAWINGS

The above mentioned and other concepts of the present invention will now be described with reference to the drawings of the exemplary and preferred embodiments of the present invention. The illustrated embodiments are intended to illustrate, but not to limit the invention. The drawings contain the following figures, in which like numbers refer to like parts throughout the description and drawings wherein:

FIG. 5 illustrates another exemplary message flow diagram of a communication system having a centralized-congestion avoidance in a G-PON in accordance with the present invention.

FIG. 6 illustrates an exemplary flow diagram for a method of a communication system in accordance with the present invention

DETAILED DESCRIPTION OF THE INVENTION

The invention described herein may employ one or more of the following concepts. For example, one concept relates to a centralized-congestion avoidance located in an Optical Line Terminator (OLT). Another concept relates to a dynamic-congestion avoidance in a Passive Optical Network (PON). Another concept relates to collocating the congestion avoidance with a Dynamic Bandwidth Allocation (DBA) mechanism in the OLT. Another concept relates to a remotely located congestion avoidance as viewed by an Optical Network Terminator (ONT). Yet another concept relates to discarding a packet from a priority queue in the ONT for congestion avoidance. Still another concept relates to a feedback mechanism periodically providing information to facilitate a dynamic update of a congestion-avoidance parameter.

The present invention is disclosed in context of use of a Gigabit Passive Optical Network (G-PON). The principles of the present invention, however, are not limited to use within a G-PON but may be applied to other PONs such as Broadband PON (BPON) or Ethernet PON (EPON). Also, while the present invention is disclosed in context of use of an OLT in conjunction with one or more ONT other network terminators for the G-PON, such as an Optical Network Unit (ONU), may be used. Furthermore, a Transmission Control Protocol (TCP) is disclosed as the transport layer in accordance with the Open System Interconnection (OSI) reference model. However, other transport protocols that provide a reliable transmission and a traffic congestion mechanism to slow down traffic during congestion may be used. The present invention is further disclosed in context of use of a modified Random Early Detection (RED) for providing centralized and dynamically-adjustable-congestion avoidance. One skilled in the art would recognize other congestion avoidance schemes such as Weighted Random Early Detection could be modified to provide centralized and dynamically-adjustable-congestion avoidance. Thus, the illustration and description of the present invention in context of a G-PON having a modified RED for providing centralized and dynamically-adjustable-congestion-avoidance is merely one possible embodiment of the present invention.

Figure 1:
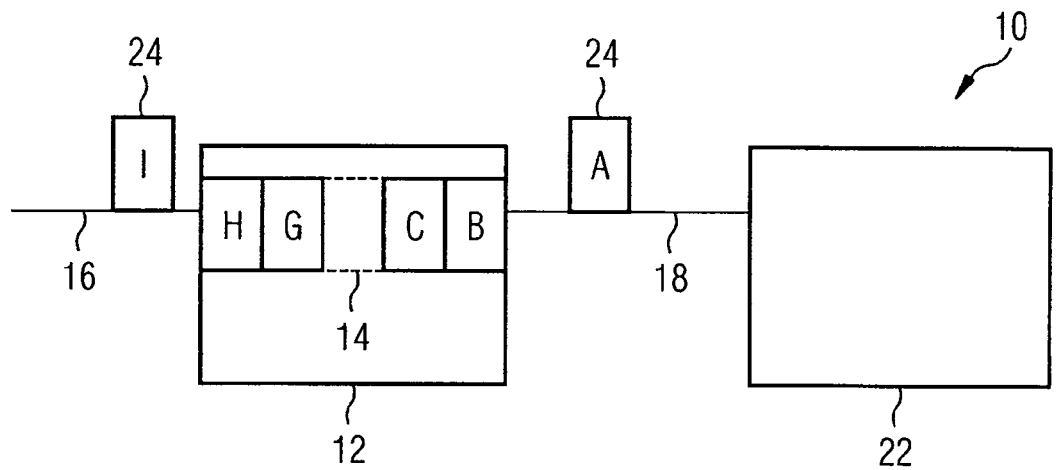
FIG. 1 illustrates an exemplary prior art schematic diagram of a communication system having a standalone congestion handling in a G-PON system.

Referring to FIG. 1, an exemplary schematic diagram of a prior art communication system 10 having standalone congestion handling in a G-PON is shown. The G-PON includes an ONT 12 having a First-In-First-Out (FIFO) priority queue 14, a bidirectional communication link 18, and an OLT 22. The bidirectional communication link 18 facilitates communication between the ONT 12 and the OLT 22. A bidirectional communication link 16 allows subscribers of the ONT 12 to communicate with the G-PON via the ONT 12.

The priority queue 14 stores packets from the subscriber that are to be sent to the OLT 22. In the exemplary example of FIG. 1, the priority queue 14 is full having packets B, C, G, and H where B is at the head of the priority queue 14 and H is at the tail of the priority queue 14. Traffic 26 is sent from the ONT 12 to the OLT 22 and includes packet A that was previously in the priority queue 14. Traffic 24 is sent from the subscriber to the ONT 12 and includes packet I.

Figure 2:
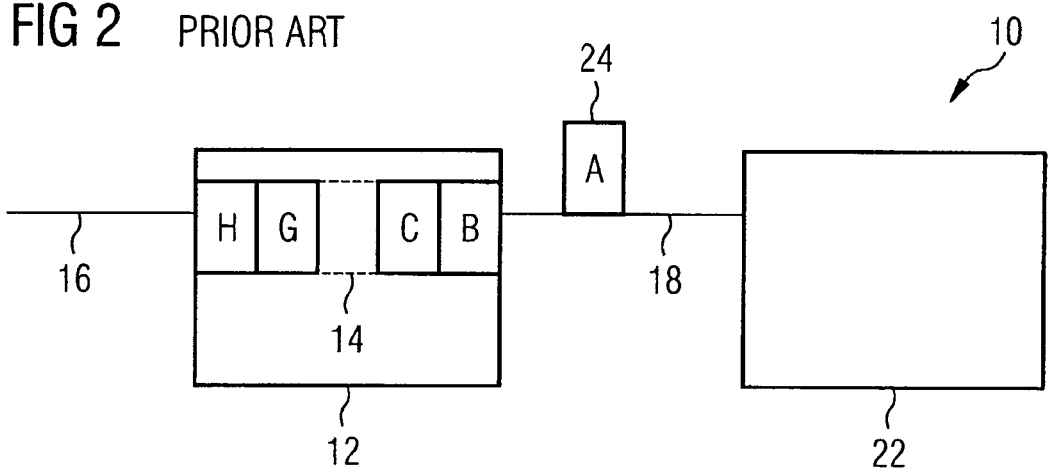
FIG. 2 illustrates another embodiment of an exemplary prior art schematic diagram of a communication system having a standalone congestion handling in a G-PON system.

Referring now to FIG. 2, another exemplary schematic diagram of a prior art communication system 10 having standalone congestion handling in a G-PON is shown. With the priority queue 14 is full, congestion is handled by dropping incoming traffic from the subscriber. Another words, the traffic 24 (FIG. 1) is dropped via the ONT 12 prior to entering the priority queue 14. Dropping traffic due to the priority queue 14 being full, also known as tail dropping, is an easy and inexpensive approach to handling congestion. However, this approach is weak and reacts when congestion occurs and is not a method to avoid congestion.

Commonly used approaches to avoid congestion, such as RED or WRED could be included on the ONT 12 in a standalone basis. RED/WRED uses various criteria such as average queue size to determine when to drop packets prior to entering the priority queue 14. However, including a standalone RED/WRED to the ONT 12 is costly and has limited effectiveness.

Figure 3:
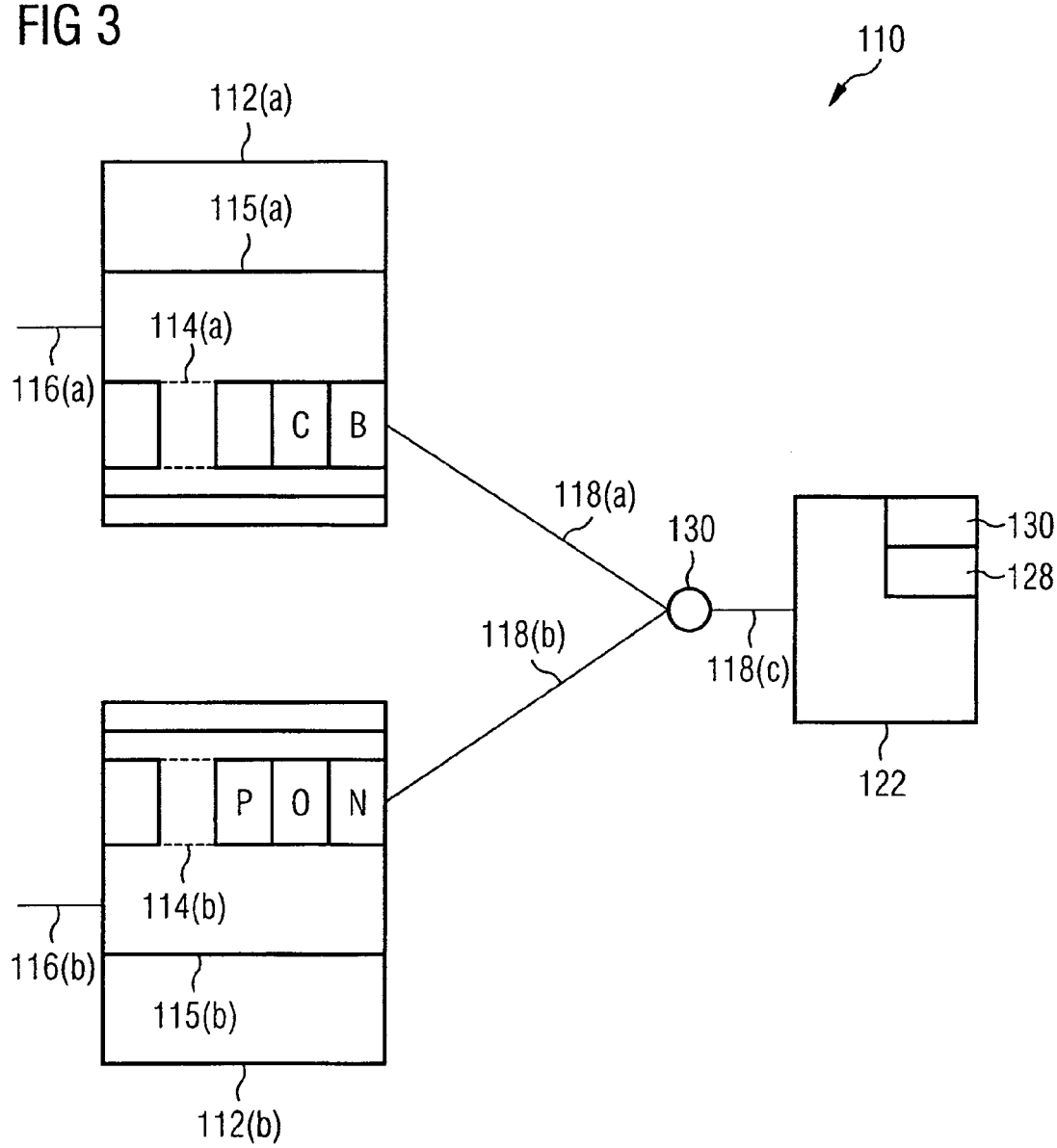
FIG. 3 illustrates an exemplary schematic diagram of a communication system having a centralized congestion avoidance mechanism in a G-PON system in accordance to the present invention.

Referring now to FIG. 3, an exemplary schematic diagram of a communication system 110 having a centralized-congestion avoidance in a G-PON in accordance with the present invention is shown. The G-PON includes a plurality of ONTs 112 each having a Transmission Container (T-CONT) 115, a bidirectional communication link 118, a passive splitter 130, and an Optical Line Terminator (OLT) 122 having a feedback mechanism 128 and a DBA mechanism 130.

Communication between the ONTs 112 and the OLT 122 is facilitated via the bidirectional communication link 118 and the splitter 130. Subscribers of the ONT 112 are connected to the ONT 112 via a bidirectional communication link 116. Communication in the direction of the subscriber towards the OLT 122 is an upstream communication, whereas communication in the direction of the OLT 122 towards the subscriber is a downstream communication.

For example, the ONT 112 is shown including a single T-CONT 115. However, the ONT 112 may include a plurality of T-CONTs 115. A T-CONT 115 is used by the ONT 112 to transport multiplexed subscriber packets toward the OLT 122 using the bandwidth granted specifically to the T-CONT 115 by the OLT 122. The type of the T-CONT 115 determines the types of upstream bandwidth assigned by the OLT 122 including fixed, assured, non-assured and best-effort bandwidth.

For example, the T-CONT 115 shown includes a single FIFO single priority queue 114. However, the T-CONT 115 may include a plurality of priority queues 114 wherein each priority queue accommodates a subset of the priorities for the traffic from the subscriber. It would be recognized by those skilled in the art that the congestion handling for a plurality of priority queues 114 would need to consider the priority type of each priority queue 114.

A packet from the subscriber is stored in the priority queue 114 and the packet may later be sent to the OLT 122 via the bidirectional communication link 118. The ONT 112(a) includes the priority queue 114(a) having packets B and C where B is at the head of the priority queue 114(a) and packet C is at the tail of the priority queue 114(a). The ONT 112(b) includes the priority queue 114(b) having the packets N, O, and P where N is at the head of the priority queue 114(b) and P is at the tail of the priority queue 114(b).

The G-PON employs the DBA mechanism 130 in the OLT 122 to handle dynamically assigning bandwidth due to oversubscription as described in further detail below. In addition, the DBA mechanism 130 may be extended to include congestion-avoidance parameters. The exemplary embodiment uses RED congestion-avoidance parameter such as a minimum threshold, a maximum threshold and a maximum drop probability.

The feedback mechanism 128 allows incremental adjustments to the congestion-avoidance parameters by analyzing the overall upstream bandwidth utilization from the ONTs 112 following each adjustment. The overall upstream bandwidth utilization may be determined from a queue fill level provided by the ONTs 112. Thus the congestion-avoidance parameters are dynamically adjusted. In the exemplary embodiment the RED congestion-avoidance parameters are dynamically adjusted per T-CONT 115. It would be understood by those skilled in the art that if WRED were used the congestion-avoidance parameters would be dynamically adjusted per priority queue 114. In contrast, the congestion-avoidance parameters in the standalone approach are static or at most administratively adjustable via a network operator. Furthermore, in the standalone approach a dynamic adjustment is not possible due to lack of visibility to bandwidth utilization. The feedback mechanism 128 should be periodically executed. 128. For example, the feedback mechanism 128 should be executed periodically every 2 milliseconds or less. Preferable, the feedback mechanism 128 is at the same cycle as the DBA mechanism 130.

The DBA mechanism 130 and the feedback mechanism 128 provide for a centralized-congestion avoidance in the OLT 122. Therefore, the congestion avoidance according to the ONT 112 is remotely handled by the OLT 122.

Figure 4:
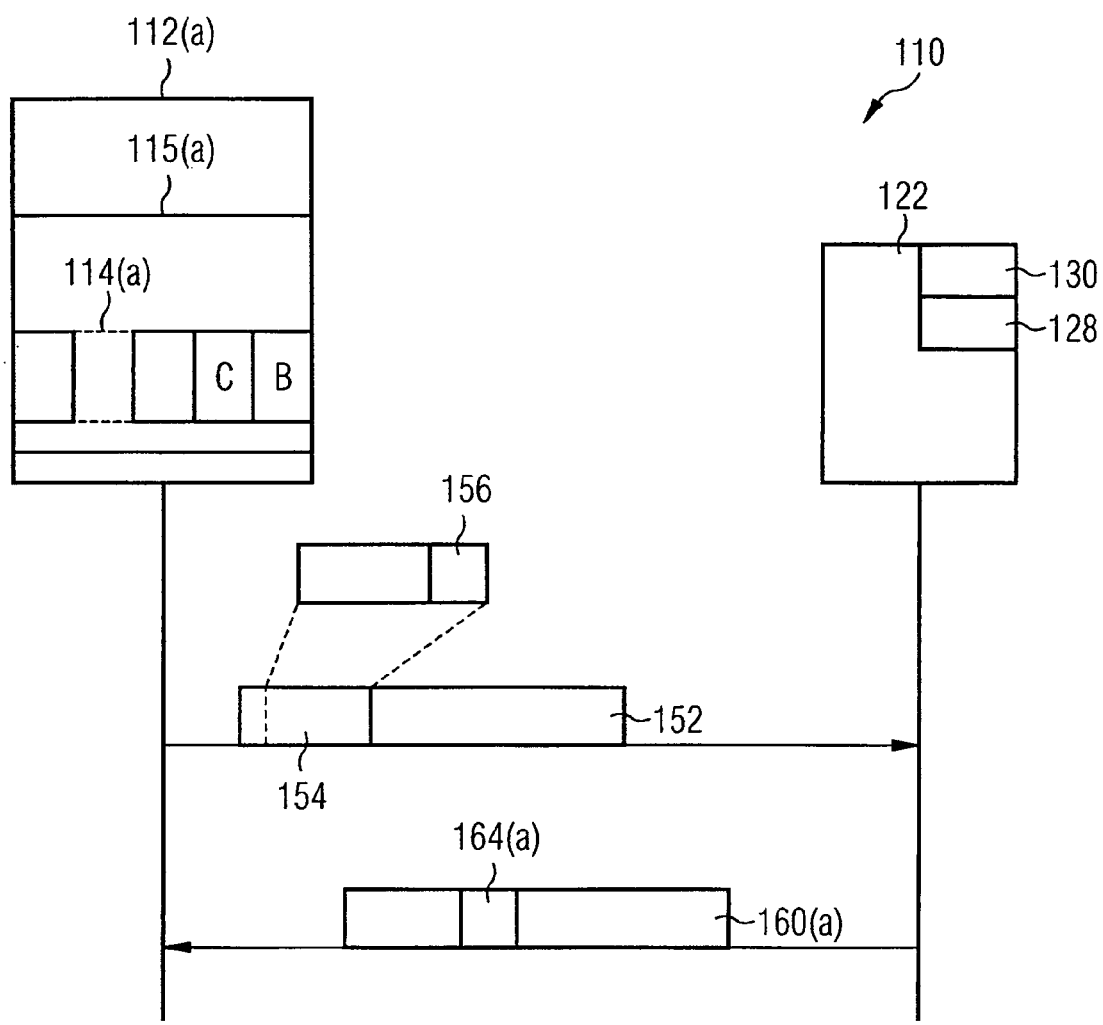
FIG. 4 illustrates an exemplary message flow diagram of a communication system having a centralized-congestion avoidance in a G-PON in accordance with the present invention.

Referring now to FIG. 4, an exemplary message flow diagram of the communication system 110 in accordance with the present invention is shown. Periodically, the ONT 112(a) will have information concerning the T-CONT 115 (a) to send to the OLT 122. The T-CONT information 156 is included in a Dynamic Bandwidth Report upstream (DBRu) portion 154 of a transmission 152 to the OLT 122. The T-CONT information 156 may include, for example, the queue fill level and an identifier of the T-CONT 115(a). The queue fill level is the amount of data currently stored in the priority queue 114(a). In the case that T-CONT 115(a) has a plurality of priority queues, it would be understood that the amount of data stored may be individually reported for each priority queue.

After the OLT 122 receives the transmission 152, the DBA mechanism 130 uses the T-CONT information 156 to determine an adjusted bandwidth allocation for the T-CONT 115(a). Furthermore, the feedback mechanism 128 analyzes upstream bandwidth utilization for each of the bandwidth type. The information in both the DBA mechanism 130 and the feedback mechanism 128 are used to dynamically update the parameters that are used in determining if a packet should be discarded.

A transmission 160 from the OLT 122 to the ONT 112 includes an upstream bandwidth map having T-CONT 115 specific allocation structures including a packet-drop command 164. The packet-drop command 164 may include, for example the following:

Discard a packet in the priority queue 114,
Discard a packet in the priority queue 114 and start dropping all incoming packets to the queue 114, and
Stop dropping all incoming packets to the queue 114.

It would be understood by those skilled in the art that if a plurality of priority queues 114 were used, then the specific priority queue would be specified to handle the packet-drop command 164.

The exemplary transmission 160(a) includes the packet-drop command 164(a) to discard a packet in the priority queue 114(a) and to start dropping all incoming packets to the queue 114(a). The ONT 112(a) may discard the packet at the head of the priority queue 114(a). Likewise, The ONT 112(a) may discard the packet at the tail of the priority queue 114(a).

Referring now to FIG. 5, another exemplary message flow diagram of the communication system 110 in accordance with the present invention is shown. FIG. 5 shows an update of the ONT 112(a) after executing the packet-drop command 164(a) from FIG. 4 by the ONT 112(a). In this case, the packet at the head of the queue 114(a) was discarded and the head of the priority queue 114(a) was updated.

After receiving a command to drop incoming packets, the ONT 112(a) continues to drop incoming packets until the ONT 112(a) receives a transmission 160(b) having a subsequent packet-drop command 164(b). At which point the subsequent packet-drop command 164(b) is executed. The exemplary transmission 160(b) includes the packet-drop command 164(a) to stop dropping all incoming packets.

Referring now to FIG. 6, an exemplary flow diagram for a method of the communication system 110 in accordance with the present invention is shown. The OLT receives the available priority queue size from each ONT 200. The available queue size is a size that is provisioned at the ONT.

The OLT then initializes the congestion-avoidance parameters for each priority queue 202. The initialization is based on the received priority queue sizes and may further be based on network operator input.

Next, the OLT determines a target queue size for each priority queue 204. The determination is based on the initial values of the congestion-avoidance parameters. A preferable target queue size places the queue in equilibrium so that the available amount of bandwidth is proportional to the regulated amount of upstream traffic. Thus, congestion is avoided.

A T-CONT traffic waiting at an ONT is detected by the OLT 206. In response, the OLT allocates bandwidth to the T-CONT 208 when available. This information is sent to the OLT. The OLT in turn sends a DBRu request for the queue fill level. The OLT receives the DBRu status report and updates the bandwidth allocation for the T-CONT.

In addition, the OLT updates the RED congestion-avoidance parameter and the target queue size 212. Additionally, the OLT calculates the average queue size and determines a packet drop command 214. The average queue size is used to smooth out transient bursts so the drop command is issued using on a drop probability that corresponds to the long-term traffic amount. The OLT sends the updated bandwidth allocation and drop commands to the ONT 216. The ONT executes the drop command and updates the bandwidth 118.

Those skilled in the art would understand that various elements of the method may be repeated. That is elements may be looped through multiple times. For example, if the OLT receives a plurality of T CONTs then elements 206-218 may be looped though for each received T_CONT.

Although the present invention has been described with the ONT 112 having a single priority queue 114 it would be understood by those skilled in the art that the ONT 112 may include plurality of priority queues 114, in which case a modified WRED mechanism could be used. Furthermore, different modes for a DBRu report may be used to support a report containing a fill level for each queue in the case of multiple priority queues. Also, additional drop commands may need to be defined to encode the queue types in the commands.

While the invention has been described in terms of a certain preferred embodiment and suggested possible modifications thereto, other embodiments and modifications apparent to those of ordinary skill in the art are also within the scope of this invention without departure from the spirit and scope of this invention. For example, a PON is not limited to 2 ONTs or a single splitter. Thus, the scope of the invention should be determined based upon the appended claims and their legal equivalents, rather than the specific embodiments described above.

The invention claimed is:

1. A method for congestion avoidance in a passive optical network having an optical line terminator communicatively connected to a plurality of optical network termination devices, comprising:
   periodically requesting a dynamic bandwidth allocation information from an optical network termination device by the optical line terminator;
   receiving the dynamic bandwidth allocation information having a queue fill level from the optical network termination device in response to the request;
   determining an adjusted bandwidth allocation for the optical network termination device by the optical line terminator;
   determining by the optical line terminator a packet-drop command to be taken at the optical network termination device; and
   sending to the optical network termination device the adjusted bandwidth allocation and the packet-drop command,
   whereby a dynamic congestion avoidance is provided centrally at the optical line terminator for the plurality of devices.

2. The method according to claim 1, wherein the packet-drop command indicates to drop a packet in a priority queue.

3. The method according to claim 2, wherein the packet-drop command further indicates to start dropping incoming packets to the queue and to drop a packet in a priority queue.

4. The method according to claim 1, wherein the dynamic bandwidth allocation information includes the amount of data currently stored in a priority queue.

5. The method according to claim 1, wherein the packet-drop command indicates to stop dropping packets in the priority queue.

6. The method according to claim 1, wherein the determining of the packet-drop command includes adjusting a congestion-avoidance parameter based on the monitoring and the dynamic bandwidth allocation information.

7. The method according to claim 6, wherein a plurality of congestion-avoidance parameter based on a random early detection mechanism or a weighted random early detection mechanism are adjusted.

8. The method according to claim 1, wherein the dynamic bandwidth allocation information includes the amount of data currently stored in the priority queue.

9. A method for congestion avoidance in an optical network termination device of a passive optical network, comprising:
sending upon request, a dynamic bandwidth allocation information to an optical line terminator;
receiving an adjusted bandwidth allocation and a packet-drop command from the optical line terminator; and
executing the packet-drop command,
whereby a dynamic congestion avoidance is provided remotely for the optical line terminator.

10. The method according to claim 9, wherein the packet-drop command indicates to drop a packet in a priority queue.

11. The method according to claim 10, wherein the packet-drop command further indicates to start dropping incoming packets to the queue and to drop a packet in a priority queue.

12. The method according to claim 9, wherein the packet-drop command indicates to stop dropping packets in the priority queue.

13. The method according to claim 9, wherein the device is an ONT or and ONU.

14. An optical line terminator providing a dynamic congestion avoidance in a passive optical network, comprising:
a communication connection to a plurality of optical network termination devices each having a priority queue;
a plurality of network avoidance parameters;
a dynamic bandwidth mechanism that allocates bandwidth for the optical network termination devices and that dynamically updates the network avoidance parameters; and
a feedback mechanism that analyzes upstream traffic from the optical network termination device and periodically provides information based on the analysis to the dynamic bandwidth mechanism to aid in the update of the parameters,
whereby a dynamic congestion avoidance is provided centrally at the optical line terminator for the plurality of devices.

15. The optical line terminator according to claim 14, further comprising:
a target queue size for each priority queue; and
a packet-drop command that is updated based on the target queue size.

16. The optical line terminator according to claim 14, wherein the feedback mechanism provides information to the dynamic bandwidth mechanism every 2 milliseconds or less.

17. The optical line terminator according to claim 14, wherein the feedback mechanism provides at a cycle of the dynamic congestion avoidance.

18. The optical line terminator according to claim 14, wherein
the packet-drop command indicates to drop a packet in a priority queue,
the packet-drop command further indicates to start dropping incoming packets to the queue to drop a packet in a priority queue, or
the packet-drop command indicates to stop dropping packets in the priority queue.

* * * * *